United States Patent
Nabeshima et al.

(10) Patent No.: US 8,160,773 B2
(45) Date of Patent: Apr. 17, 2012

(54) TRAVEL DRIVE APPARATUS FOR A WORKING VEHICLE

(75) Inventors: Yoshifumi Nabeshima, Tsuchiura (JP); Takayoshi Murahashi, Tsuchiura (JP); Toshikazu Minoshima, Kasumigaura (JP); Yutaka Watanabe, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 279 days.

(21) Appl. No.: 12/631,252

(22) Filed: Dec. 4, 2009

(65) Prior Publication Data

US 2010/0187044 A1   Jul. 29, 2010

(30) Foreign Application Priority Data

Jan. 28, 2009  (JP) .................................. 2009-16659

(51) Int. Cl.
*B60K 17/14* (2006.01)
*B60K 11/02* (2006.01)

(52) U.S. Cl. ............. 701/36; 701/50; 184/26; 180/65.6; 180/339

(58) Field of Classification Search .............. 701/36, 701/50; 180/339, 65.6, 65.7; 192/113.3, 192/70.12; 184/26; 74/607
See application file for complete search history.

(56) References Cited

U.S. PATENT DOCUMENTS

| | | | |
|---|---|---|---|
| 3,770,074 A * | 11/1973 | Sherman | 180/65.6 |
| 4,799,564 A | 1/1989 | Iijima et al. | |
| 2008/0296121 A1* | 12/2008 | Miyazaki et al. | 192/113.3 |
| 2010/0187042 A1* | 7/2010 | Murahashi et al. | 184/6.3 |
| 2010/0187043 A1* | 7/2010 | Murahashi et al. | 184/6.3 |
| 2010/0187044 A1* | 7/2010 | Nabeshima et al. | 184/26 |
| 2010/0191417 A1* | 7/2010 | Murahashi et al. | 701/36 |

FOREIGN PATENT DOCUMENTS

| | | |
|---|---|---|
| JP | 62-221918 A | 9/1987 |
| JP | 2006-264394 A | 10/2006 |

OTHER PUBLICATIONS

U.S. Appl. No. 12/633,190, filed Dec. 8, 2009 in the name of Takayoshi Murahashi et al.

* cited by examiner

*Primary Examiner* — Ruth Ilan
(74) *Attorney, Agent, or Firm* — Mattingly & Malur, PC

(57) ABSTRACT

In case a temperature (T) of a lubricant oil (G) cannot be detected by an oil temperature sensor (51) provided on an output side of a lubricant pump (46), the temperature (Tm) of a wheel drive motor (17) is detected by using a motor temperature sensor (53) provided on the wheel drive motor (17). By estimating the temperature (T) of the lubricant oil (G) from the temperature (Tm) of the wheel drive motor (17), monitoring is carried out as to whether or not the temperature (Tm) has risen to a predetermined temperature (Tms) at which the cooling of the lubricant oil (G) by forced circulation is deemed necessary. The drive of a lubricant pump (46) by a pump drive motor (47) is stopped until the motor temperature (Tm) rises to a level exceeding the predetermined temperature (Tms).

6 Claims, 8 Drawing Sheets

TRAVEL DRIVE APPARATUS FOR A WORKING VEHICLE

BACKGROUND ART

1. Field of the Invention

The present invention relates to a travel drive apparatus for a working vehicle such as a large-size transportation vehicle and dump truck which is suitably used in transporting crushed stones excavated from a mine or the like.

2. Description of the Prior Art

Generally, large-size transportation vehicles, called dump trucks, have a liftable vessel (a loading platform) on a frame of a vehicle body, and carry heavy objects to be transported like crushed stones in a state in which the objects to be transported are loaded in a large quantity on the vessel.

In this regard, for example, a travel drive apparatus which is adapted to drive a drive wheel of a dump truck is provided with a tubular axle housing which is mounted on a vehicle body, a drive source such as an electric motor or a hydraulic motor which is provided in the axle housing and rotationally drives a rotational shaft, a wheel mounting case rotatably mounted around an outer periphery on the fore end side of the axle housing through a bearing to support a drive wheel thereon for traveling, and a multi-stage reduction gear mechanism incorporated into the wheel mounting case and is adapted to reduce the speed of rotation of the rotational shaft so as to transmit this rotation to the wheel mounting case (Japanese Patent Laid-Open No. S62-221918 A and 2006-264394 A).

By a multi-stage reduction gear mechanism of this sort, rotational output of a drive source like a electric motor, for example, is reduced in speed and transmitted to a tubular wheel mounting case (wheel) to generate a large rotational torque in a drive wheel of a dump truck, namely in a front or rear wheel to thereby enhance the transporting performance of the dump truck (vehicle). In addition, a travel drive apparatus for a dump truck is normally adapted to rotationally drive left and right wheels by respective reduction gear mechanisms independently of each other.

In order to keep each gear member of the reduction gear mechanism in a lubricated state, the lubricant oil is pooled in a tubular wheel mounting case on which a drive wheel is to be mounted. Further, this lubricant oil is forcibly circulated in and outside the wheel mounting case (axle housing) by using a lubricant pump. Moreover, the lubricant oil is cooled by being subjected to heat exchange by an oil cooler provided in the course of a circulation line.

In this case, for example, a lubricant pump is located on the outer side of the axle housing. A suction pipe is provided by being connected to a suction side of the lubricant pump, with the one side (suction port side) of the suction pipe being extended into and immersed in the lubricant oil pooled in the wheel mounting case. On the other hand, an output pipe or a supply pipe is provided by being connected to the output side of the lubricant pump, and the other side of the supply pipe is disposed so as to be extended into the wheel mounting case at a position above the suction pipe.

Incidentally, with the above-described conventional art, if the travel speed of the vehicle is increased by rotating the wheels at high speed, the lubricant oil pooled in the wheel mounting case is subjected to the influence of centrifugal force accompanying the rotation of that wheel mounting case. For this reason, the lubricant oil behaves in such a manner as to stick to the entire periphery of the inner wall surface of the wheel mounting case, and hence there are cases where the surface level of the lubricant oil drops to a position lower than the suction port of the suction pipe.

Accordingly, when the travel speed of the working vehicle is increased to cause the suction port of the suction pipe disposed in the wheel mounting case to become located away from the surface level of the lubricant oil, the action of sucking the lubricant oil by the lubricant pump becomes impossible. As a result, the lubricant pump assumes an idling state and is driven dry, so that seals, bearings, and the like of the lubricant pump are likely to become worn and damaged at an early period, causing the pump life to become shortened.

Accordingly, in order to prevent the lubricant pump from assuming the idling state, the present inventors studied the feasibility of immediately stopping the drive of the lubricant pump when the travel speed of the vehicle has become faster than a predetermined determination speed. However, in an initial stage of vehicle operation such as during a warm-up operation, the temperature of the lubricant oil is low, so that the viscous resistance becomes large, and the suction characteristic in the suction of the lubricant oil by the lubricant pump undesirably changes due to its dependence on the temperature of the lubricant oil (viscous resistance).

Namely, when the temperature of the lubricant oil is low at a temperature of, for example, not more than 50° C. in the initial stage of vehicle operation, even if the vehicle is traveling at a lower speed than the aforementioned determination speed during steady operation, the suction characteristic based on the lubricant pump becomes instable. As a result, there is a problem in that cavitation is prone to occur due to the suction of air, possibly shortening the pump life.

Meanwhile, also as for the installation position of an oil temperature sensor for detecting the temperature of the lubricant oil, since the configuration provided is such that a reduction gear mechanism is provided in the wheel mounting case, and the lubricant oil is pooled in the interior, it is, in practice, difficult to provide an oil temperature sensor, for instance, inside the wheel mounting case to directly detect the temperature of the lubricant oil, because structural restrictions are large.

For this reason, the present inventors studied the feasibility of providing the oil temperature sensor on the output side of the lubricant pump by being located outside the wheel mounting case. In this case, however, when the lubricant pump is stopped, it becomes impossible to send the lubricant oil pooled in the wheel mounting case to the position of the oil temperature sensor, with the result that it is impossible to directly detect the temperature of the lubricant oil by using the oil temperature sensor.

Therefore, at the time of starting the operation of the working vehicle at a work site, unless the lubricant pump is started once, the temperature of the lubricant oil cannot be detected by using the oil temperature sensor. For this reason, when the travel of the vehicle has carried on without detecting the temperature of the lubricant oil, there is a problem in that even if the temperature of the lubricant oil actually rises, since the supply control of the lubricant oil is not effected, it is impossible to allow the cooling action based on the lubricant oil to be demonstrated.

SUMMARY OF THE INVENTION

In view of the above-discussed problem with the prior art, it is an object of the present invention to provide a travel drive apparatus for a working vehicle which, by detecting the temperature of the drive source at the time of starting the vehicle operation, is capable of controlling the start of the lubricant pump in accordance with not the temperature of the lubricant oil but the temperature of the drive source, and which is capable of controlling the drive and stop of the lubricant pump in accordance with the temperature of the lubricant oil detected by the oil temperature sensor and the travel speed of the vehicle after the start of the lubricant pump.

(1) In order to achieve the above-stated object, according to the present invention, there is provided a travel drive apparatus for a working vehicle, comprising: a tubular wheel mounting case provided on a working vehicle and rotating integrally with a wheel; a reduction gear mechanism provided in the wheel mounting case to reduce the speed of rotation of a drive source and transmit it to the wheel mounting case; lubricant oil circulation means for supplying a lubricant oil to the reduction gear mechanism; an oil temperature sensor for detecting a temperature of the lubricant oil; and a speed sensor for detecting a rotational speed of the wheel.

The present invention is characterized in that the drive source is provided with a drive source temperature sensor for detecting a temperature of the drive source, the lubricant oil circulation means being constituted by an electric motor, a lubricant pump for forcibly circulating the lubricant oil pooled in the wheel mounting case by being driven by the electric motor, and control means for controlling the drive and stop of the electric motor in accordance with the rotational speed of the wheel, the control means being configured to keep the electric motor in a stopped state until the temperature of the drive source detected by the drive source temperature sensor reaches a predetermined temperature.

With the arrangements just described, under the condition in which the vehicle has been warmed up after the start of the engine and has assumed the state of steady operation, the lubricant pump can be started by driving the electric motor when the rotational speed of the wheel (travel speed of the vehicle) is lower than a predetermined determination speed, thereby forcibly circulating the lubricant oil pooled in a wheel mounting case. In consequence, the temperature of the lubricant oil which flows in and outside the wheel mounting case through circulation lines can be lowered by using an oil cooler, and the lubricant oil whose oil temperature is low can be supplied to the reduction gear mechanism inside the wheel mounting case, thereby making it possible to enhance the lubrication performance and cooling performance. Moreover, in this state, when the rotational speed of the wheel (travel speed of the vehicle) has become faster than the predetermined determination speed, the lubricant oil in the wheel mounting case behaves in such a manner as to stick to the entire periphery of the inner wall surface of the wheel mounting case under the influence of centrifugal force, so that there is a possibility that the action of sucking the lubricant oil by the lubricant pump becomes impossible. Accordingly, in such a case, the control means stops the drive of the lubricant pump by the electric motor and makes it possible to prevent the lubricant pump from assuming an idling state and continuing dry operation.

Meanwhile, in the initial stage when the vehicle has started a warm-up operation by the start of the engine, unless the lubricant pump is initially started by the electric motor, the lubricant oil pooled in the wheel mounting case will not be sent to the position of the oil temperature sensor, so that the temperature of the lubricant oil cannot be detected by the oil temperature sensor. However, in the initial stage of such vehicle operation, the temperature of the drive source is relatively low, and it is known that the temperature of the lubricant oil pooled in the wheel mounting case and the temperature of the drive source are in a substantially equivalent state. Accordingly, by estimating the temperature of the lubricant oil from the temperature of the drive source, the drive of the lubricant pump by the electric motor can be stopped until the temperature of the drive source rises to a predetermined temperature at which the cooling of the lubricant oil by forced circulation is required. In consequence, it is possible to prevent the lubricant pump from being driven wastefully, making it possible to attain energy saving.

(2) According to the present invention, the control means comprises: pump start means for providing control to start the lubricant pump by the electric motor when the temperature of the drive source has reached the predetermined temperature; speed determination means for determining whether or not the speed of the wheel has exceeded a predetermined reference speed in a state in which the lubricant pump has been started by the pump start means; and pump stop means for stopping the lubricant pump when it is determined that the speed of the wheel has exceeded the reference speed by the speed determination means.

By adopting the above-described configuration, the lubricant pump can be started by the electric motor when the temperature of the drive source has reached the predetermined temperature, the lubricant oil in the wheel mounting case can be forcibly circulated by the start of the lubricant pump, and it is possible to detect the temperature of the lubricant oil by using the oil temperature sensor. Further, in the state in which the lubricant pump has been started by the pump start means, a determination can be made by the speed determination means as to whether or not the speed of the wheel has exceeded a reference speed (a speed which is sufficiently lower than the aforementioned determination speed). When the speed of the wheel has exceeded the reference speed, the lubricant pump can be stopped by the pump stop means.

As a result, even in cases where, in the initial stage of vehicle operation including the time of the warm-up operation, the viscous resistance has become large due to the low temperature of the lubricant oil, and the suction characteristic in the suction of the lubricant oil by the lubricant pump has changed due to its dependence on the temperature of the lubricant oil (viscous resistance), when the speed of the wheel has exceeded the reference speed, the lubricant pump can be stopped immediately to interrupt the suction of the lubricant oil by the lubricant pump. In consequence, it is possible to prevent the cavitation from becoming prone to occur due to the entrainment of air during the suction of the lubricant oil, thereby making it possible to improve the reliability, service life, and the like of the apparatus.

(3) According to the present invention, the control means further comprises: pump drive means for driving the lubricant pump until it is determined that the speed of the wheel has exceeded the reference speed by the speed determination means; temperature determination means for determining whether or not the temperature of the lubricant oil detected by the oil temperature sensor has risen to a predetermined reference temperature in a state in which the lubricant pump is being driven by the pump drive means; and another pump stop means for stopping the lubricant pump when it is determined that the temperature of the lubricant oil is lower than the reference temperature by the temperature determination means.

According to the above-described configuration, the drive of the lubricant pump by the pump drive means is continued until it is determined by the speed determination means that the speed of the wheel has exceeded the reference speed. In this state, a determination can be made by the temperature determination means as to whether or not the temperature of the lubricant oil detected by the oil temperature sensor has risen to the predetermined reference temperature. When the oil temperature is determined to be lower than the reference temperature as the result of this determination, the drive of the lubricant pump is stopped, thereby making it possible to prevent the lubricant pump from being driven wastefully and attain energy saving.

(4) According to the present invention, a tubular axle housing extending in left and right directions is provided on a lower portion of a vehicle body for constituting the working vehicle, a pair of the wheel mounting cases are respectively provided rotatably on outer peripheral sides of both end sides in the left and right directions of the axle housing, and the lubricant oil is pooled at a lower position in each of the wheel mounting cases.

(5) Further, according to the present invention, the lubricant oil circulation means includes a suction pipe for sucking the lubricant oil in the wheel mounting case by the lubricant pump and a supply pipe for supplying and circulating the lubricant oil sucked by the lubricant pump into an interior of the wheel mounting case; and the suction pipe extends from an interior of the axle housing and into the interior of the wheel mounting case, its suction port being opened in lubricant oil pooled at the lower portion of the wheel mounting case.

BRIEF DESCRIPTION OF THE DRAWINGS

In the accompanying drawings:

FIG. 5 is an enlarged sectional view taken from the direction of arrows V-V in FIG. 4, showing the tubular spindle, wheel mounting case, suction pipe, and the like;

FIG. 6 is a control block diagram of a vehicle controller and the like for effecting supply control of a lubricant oil, initial operation control processing, and the like;

DETAILED DESCRIPTION OF THE INVENTION

Hereafter, with reference to FIGS. 1 to 8 of the accompanying drawings, a detailed description will be given of the travel drive apparatus for a working vehicle in accordance with an embodiment of the present invention by citing as an example a case in which the present invention is applied to a rear drive type dump truck.

Figure 1:
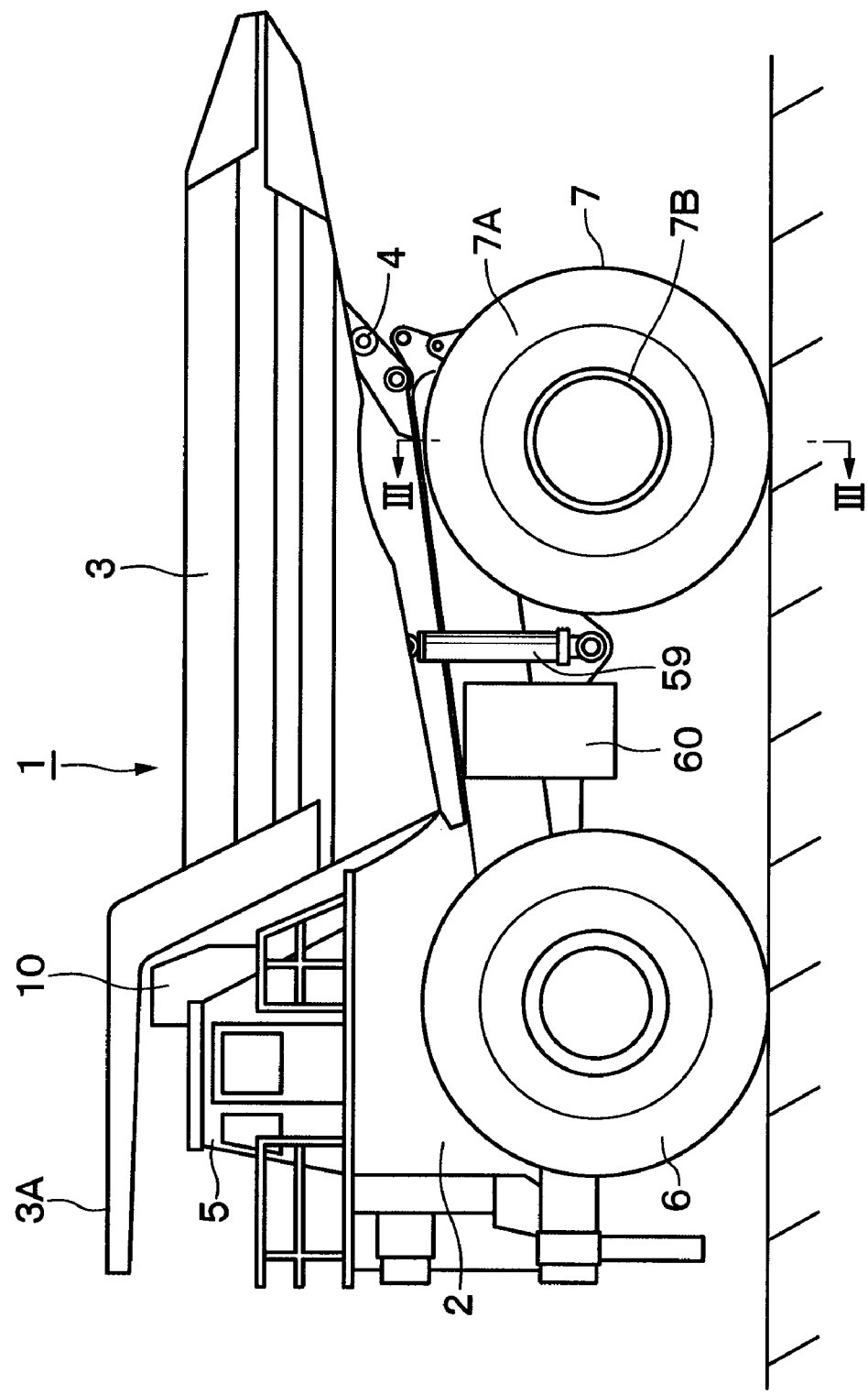
FIG. 1 is a front view of a dump truck incorporating a travel drive apparatus according to an embodiment of the present invention.

In the drawings, indicated at 1 is a dump truck as a typical working vehicle. As shown in FIG. 1, the dump truck 1 is built with a sturdy frame structure, and largely constituted by an automotive vehicle body 2 with below-described front and rear wheels 6 and 7 serving as wheels, and a vessel 3 which is liftably mounted on the vehicle body 2 as a load-carrying platform.

Further, the vessel 3 is formed as a large-size container whose overall length reaches as much as 10 to 13 meters to load a large volume of heavy load such as crushed stones or other similar objects, and its rear side bottom portion is liftably (tiltably) coupled to a rear end side of the vehicle body 2 by using a pin coupling portion 4. Further, a protector 3A is projected forward from a front top of the vessel 3 in such a way as to cover a cabin 5 from upper side, which will be described hereinafter.

Indicated at 5 is the cabin provided on the front portion of the vehicle body 2 by being located on the lower side of the protector 3A. The cabin 5 defines an operating room to be occupied by an operator of the dump truck 1, and internally equipped with an operator's seat, a start-up switch, an accelerator pedal, a brake pedal, and a steering handle along with a plural number of control levers (none of which are shown in the drawings).

The protector 3A of the vessel 3 is arranged to cover the cabin 5 almost entirely from upper side to protect the latter from flying stones or rocks, and to protect an operator in the cabin 5 in case of an overturn accident of the vehicle (the dump truck 1).

Indicated at 6 are left and right front wheels which are rotatably mounted on low front portions of the vehicle body 2. Each one of the front wheels 6 constitutes a steering wheel which is steered by an operator of the dump truck 1 (by steering actions). Similarly to rear wheels 7 which will be described below, the front wheels 6 are large in diameter (in outside tire diameter), for example, as large as 2 to 4 meters.

Indicated at 7 are left and right rear wheels which are rotatably mounted on low rear portions of the vehicle body 2. Each one of the rear wheels 7 constitutes a drive wheel of the dump truck 1, and is rotationally driven integrally with a wheel mounting case 19 by a travel drive apparatus 11 of FIGS. 3 and 4, which will be described hereinafter. Each one of the rear wheels 7 is constituted by a tire 7A and a rim 7B which is arranged to be disposed at the inner side of the tire 7A.

Figure 2:
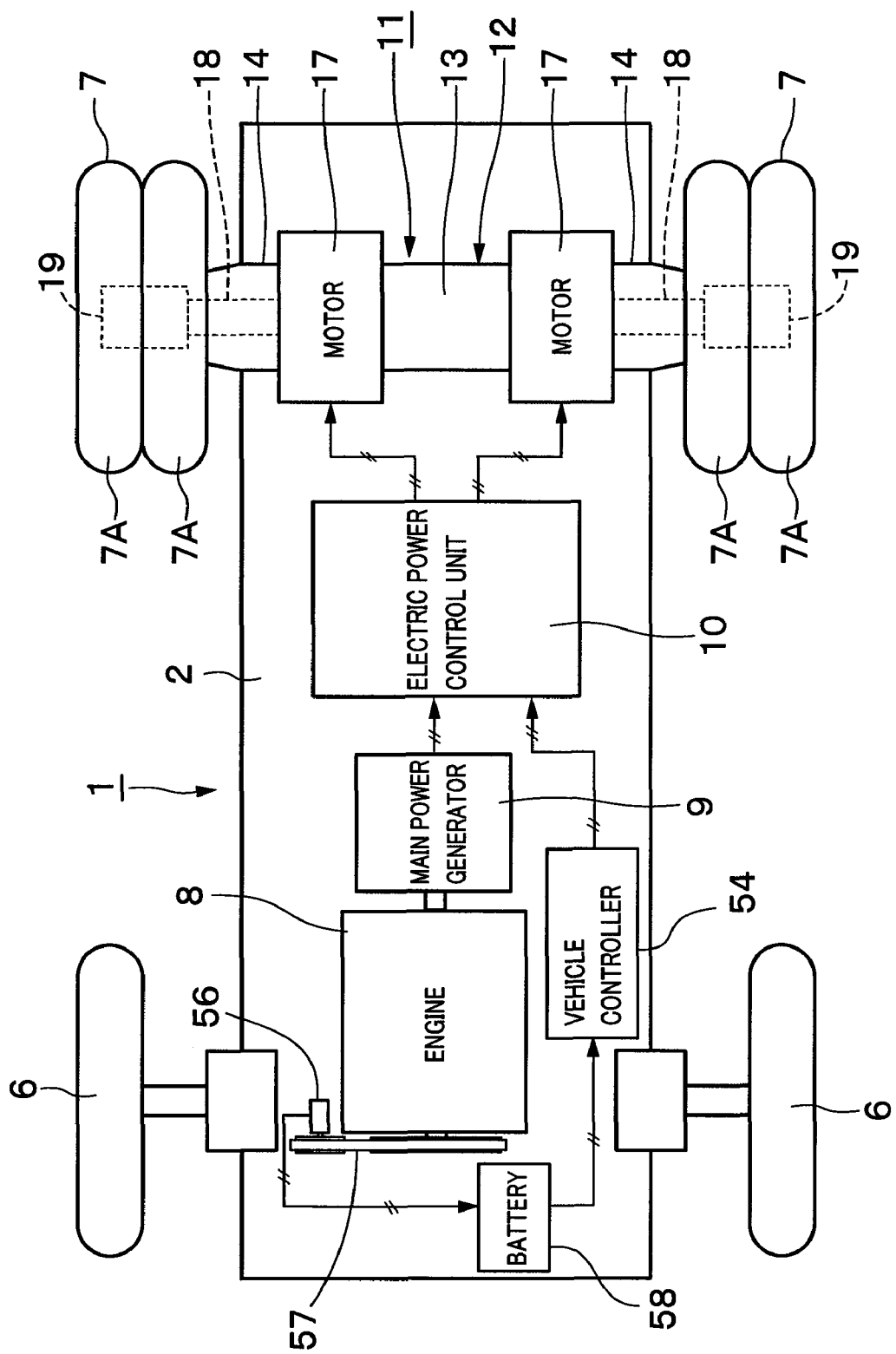
FIG. 2 is a configuration diagram of the travel drive apparatus of the dump truck.

Denoted at 8 is an engine which is mounted on the vehicle body 2 under the cabin 5 to serve as a prime mover. This engine 8 is, for example, a large Diesel engine, and drives a main power generator 9 as shown in FIG. 2 to generate a three-phase alternating current (for example, of approximately 1500 kW), as well as an auxiliary power generator 56 for direct current which will be described hereinafter. Further, the engine 8 plays a role of rotationally driving a hydraulic pump of a hydraulic pressure source (not shown) to supply hydraulic oil to and from a below-described hoist cylinder 59 and a steering cylinder (not shown) of a power steering system as well.

Indicated at 10 is an electric power control unit which controls electric power supply to the dump truck 1 together with a vehicle controller 54 which will be described hereinafter. As shown in FIG. 1, the electric power control unit 10 is constituted by a power distribution control board which is erected on the vehicle body 2 at one side of the cabin 5. Further, as shown in FIG. 2, the electric power control unit 10 functions to output electric power generated by the main power generator 9 to a wheel drive motor 17 and a pump drive motor 47 (see FIG. 6) and the like, which will be described hereinafter, according to a control signal from a below-described vehicle controller 54. Rotational speeds of the left and right wheel drive motors 17 in FIG. 2 are controlled separately by feedback control.

Next, with reference to FIGS. 3 and 4, a description will be given of the configuration of the travel drive apparatus 11 provided on the rear wheel 7 side of the dump truck 1.

The travel drive apparatus 11 is constituted by an axle housing 12, wheel drive motor 17, wheel mounting case 19 and two-stage planetary gear reduction mechanisms 23 and 31, which will be described hereinafter. The travel drive apparatus 11 is adapted to reduce the rotational speed of the wheel drive motor 17 through the two-stage planetary gear reduction mechanisms 23 and 31 to drive the rear wheel 7, which is a drive wheel of the vehicle, with a large rotational torque together with the wheel mounting case 19.

Designated at 12 is an axle housing for the rear wheel 7, provided under a rear portion of the vehicle body 2. As shown in FIG. 2, the axle housing 12 is formed in a tubular body which is extended in the axial direction between the left and right rear wheels 7 (in left and right directions). More specifically, the axle housing 12 is composed of an intermediate suspension tube 13 which is attached to the lower side of a rear portion of the vehicle body 2 through a shock absorber (not shown), and a motor accommodating tube 14 and a tubular spindle 15 which are provided at left and right ends of the suspension tube 13 respectively, as described hereinafter.

Designated at 14 is a pair of motor accommodating tubes 14 provided on both end sides of the suspension tube 13, respectively. As shown in FIG. 3, each motor accommodating tube 14 is formed in a tubular body of a round tubular shape and securely fixed at its inner axial end (at its base end side) to the suspension tube 13 by means of bolts, as shown in FIG. 2. Further, as shown in FIGS. 3 and 4, the below-described tubular spindle 15 is detachably fixed to the fore end side (outer axial end) of the motor accommodating tube 14 by means of bolts 16. A wheel drive motor 17 is accommodated in the motor accommodating tube 14 to serve as a drive source of the rear wheel 7, which will be described hereinafter.

Indicated at 15 is a tubular spindle which constitutes an opening portion on a fore end side of the axle housing 12. As shown in FIGS. 3 and 4, the tubular spindle 15 is formed in a tubular body of a tapered shape, and fixed to the motor accommodating tube 14 by the bolts 16 at a large diameter portion 15A at one axial end thereof (base end side). Further, the fore end side (outer axial end side) of the tubular spindle 15 forms a small diameter tubular portion 15B, and a final-stage carrier 36, which will be described hereinlater, is fixed on the inner periphery of an opening end portion of the small diameter tubular portion 15B.

A wheel mounting case 19 for a rear wheel 7 is mounted on the outer peripheral surface of the small diameter tubular portion 15B of the tubular spindle 15 through bearings 20 and 21, which will be described hereinafter. Thus, the wheel mounting case 19 is rotatably supported on the small diameter tubular portion 15B of the tubular spindle 15. Namely, the tubular spindle 15 is formed as a sturdy body in the shape of a tapered stepped tube, and is capable of supporting the wheel mounting case 19 (rear wheel 7) on the outer peripheral side of the small diameter tubular portion 15B with high rigidity (high strength).

On the other hand, a plural number of mounting seats 15C projecting radially inward (only one of which is shown in the drawing) are integrally formed on the inner peripheral side of the large diameter portion 15A of the tubular spindle 15, and a below-described wheel drive motor 17 is mounted by being fixed on the mounting seats 15C by the use of bolts. As shown in FIGS. 3 and 4, an annular mounting portion 15D projecting radially inward is provided on an inner peripheral side of the tubular spindle 15 at a position between the large diameter portion 15A and the small diameter tubular portion 15B to mount thereon a partition wall 37, which will be described hereinafter. Further, a radial hole 15E is bored in a lower side portion of the small diameter tubular portion 15B of the tubular spindle 15 to lead out a suction pipe 42, which will be described hereinafter, in a radially outward direction (i.e., in a downward direction).

Indicated at 17 are left and right wheel drive motors as a drive source which are detachably provided in the respective tubular spindles 15 of the axle housing 12. Each wheel drive motor 17 is constituted by a large electric motor, and rotationally driven by electric power which is supplied from the electric power control unit 10. Further, as shown in FIG. 2, for rotationally driving the left and right rear wheels 7 independently of each other, the wheel drive motors 17 are accommodated respectively in the left and right motor accommodating tubes 14 at the opposite sides of the axle housing 12.

Figure 3:
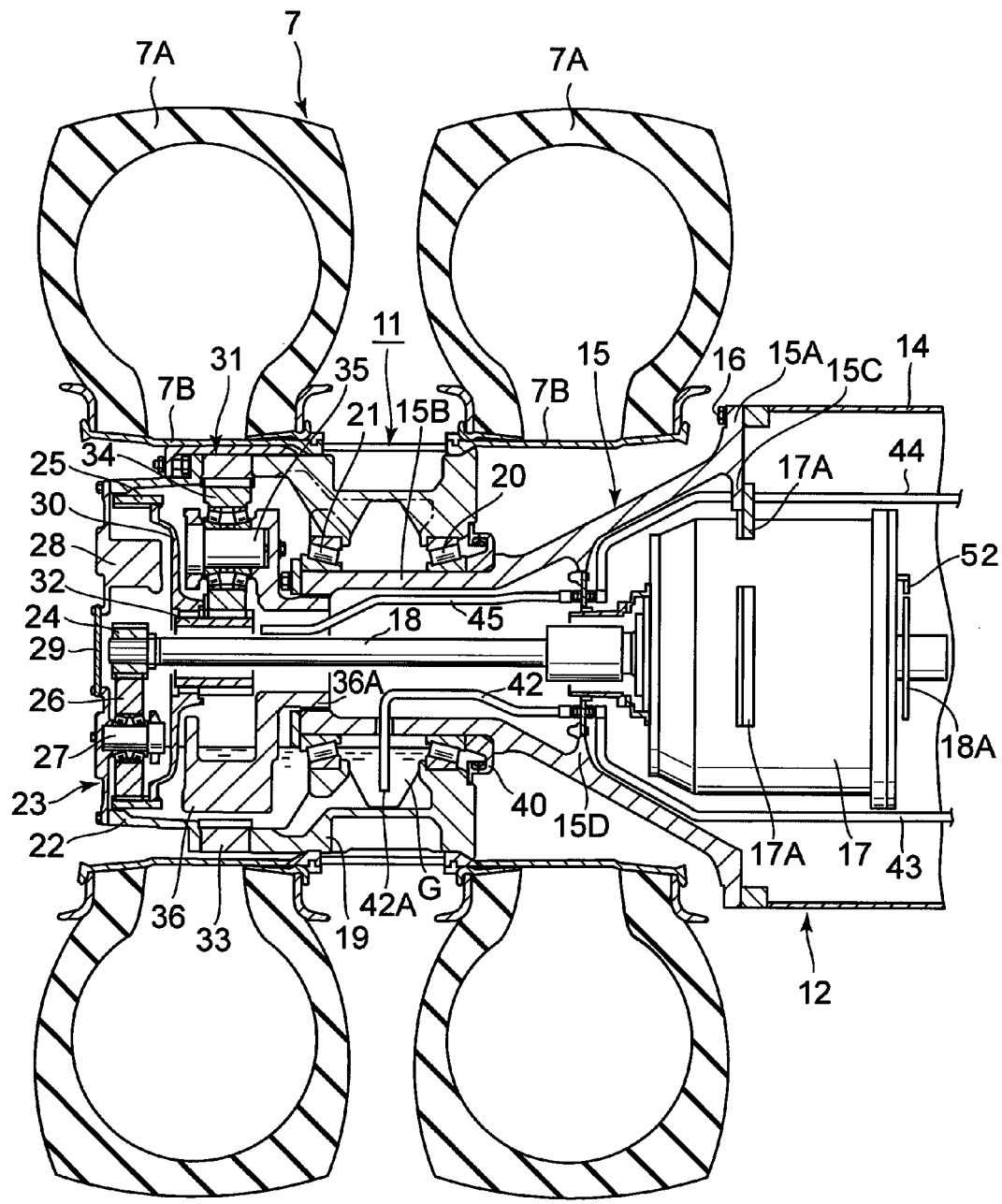
FIG. 3 is an enlarged sectional view taken from the direction of arrows III-III in FIG. 1, showing the travel drive apparatus adopted as a rear wheel drive.
Figure 4:
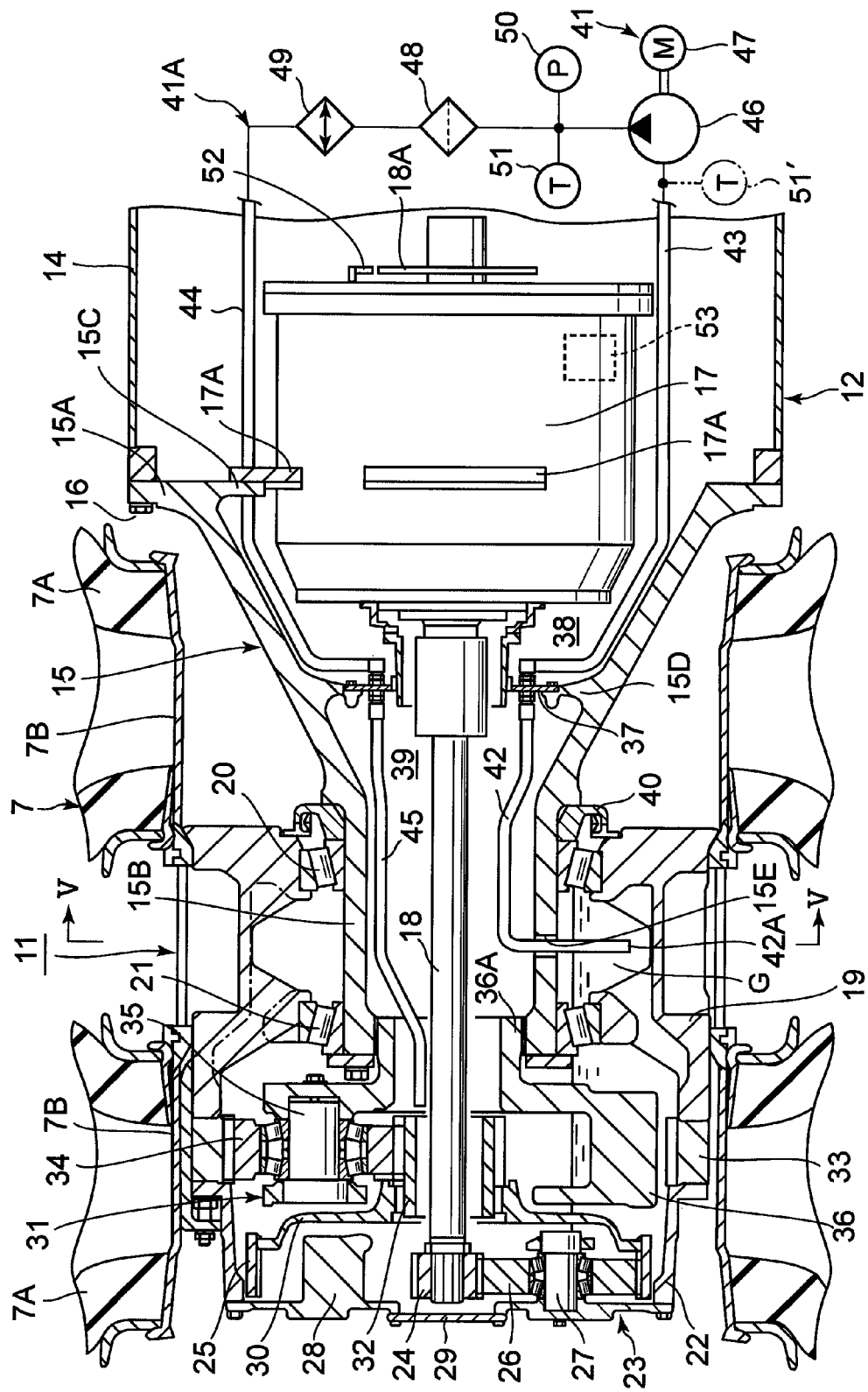
FIG. 4 is a further enlarged sectional view showing a tubular spindle, wheel mounting case, and planetary gear reduction mechanisms in FIG. 3.

In this instance, as shown in FIGS. 3 and 4, the wheel drive motor 17 is provided with a plural number of mounting flanges 17A on its outer peripheral side, the mounting flanges 17A being detachably mounted to a mounting seat 15C of the tubular spindle 15 by the use of bolts or the like. Further, each wheel drive motor 17 is provided with a rotational shaft 18 serving as an output shaft which can be driven into rotation in a forward or reverse direction by the wheel drive motor 17.

In this case, the rotational shaft 18 is in the form of an elongated shaft which is extended axially through the small diameter tubular portion 15B of the tubular spindle 15, with its fore end side axially projected out of the tubular spindle 15 as far as a confronting position relative to a lid plate 29, which will be described hereinafter. The rotational shaft 18 is provided with a male spline on the projected distal end to be splined with a sun gear 24 for integral rotation therewith as described in greater detail hereinafter. Further, as shown in FIG. 4, the wheel drive motor 17 is provided with a rotating disk 18A within the motor accommodating tube 14, the rotating disk 18A being put in rotation integrally with the rotational shaft 18 to serve as an indicant in detection of rotational speed by a speed sensor 52, which will be described hereinafter.

Denoted at 19 is a tubular wheel mounting case which is put in rotation together with the rear wheel 7. This wheel mounting case 19 constitutes what is called a wheel hub, and the rims 7B of the rear wheel 7 are detachably mounted on its outer peripheral side, for example, by press-fit means. As shown in FIGS. 3 and 4, the wheel mounting case 19 is rotatably mounted on the outer peripheral side of the tubular spindle 15 (the small diameter tubular portion 15B) through bearings 20 and 21. It should be noted that the lubricant oil G is pooled within the wheel mounting case 19, up to a surface level which is lower than the small diameter tubular portion 15B of the tubular spindle 15.

A ring-shaped internal gear 33 and an outer drum 22 which will be described hereinafter are fixed integrally to an axially outer side of the wheel mounting case 19 by the use of long bolts (not shown). This internal gear 33 is put in rotation together with the wheel mounting case 19. In this instance, rotation of a larger torque caused by reducing the rotation of the wheel drive motor 17 by the below-described planetary gear reduction mechanisms 23 and 31 is transmitted to the wheel mounting case 19 through the ring-shaped internal gear 33. Thus, the wheel mounting case 19 is rotated with a large torque, together with the rear wheel 7 which is a drive wheel of the vehicle.

Indicated at 22 is an outer drum which constitutes a part of the wheel mounting case 19 together with the internal gear 33. As shown in FIG. 4, the outer drum 22 is detachably fixed to the wheel mounting case 19 by the use of a plural number of long bolts (not shown) in such a way as to sandwich the ring-shaped internal gear 33 therebetween at an axially outer side of the wheel mounting case 19.

Indicated at 23 is a first-stage planetary gear reduction mechanism, constituting a reduction gear mechanism which is adopted in the first embodiment of the present invention.

This planetary gear reduction mechanism 23 is located internally of the outer drum 22. As shown in FIGS. 3 and 4, the first-stage planetary gear reduction mechanism 23 is composed of a sun gear 24 which is splined on a fore end side of the rotational shaft 18, planetary gears 26, for example, three planetary gears 26 (only one of which is shown in the drawing) which are meshed with the sun gear 24 and a ring-shaped internal gear 25, and put in a rotating movement in step with rotation of the sun gear 24, and a carrier 28 which rotatably supports the respective planetary gears 26 through a support pin 27.

The first-stage carrier 28 is detachably fixed in its outer peripheral side to an opening end (to an end surface of an axially outer side) of the outer drum 22 by the use of bolts, and rotates integrally with the outer drum 22 (the wheel mounting case 19). Further, a disk-shaped lid plate 29 is detachably mounted to the inner peripheral side of the carrier 28, and the lid plate 29 is removed from the carrier 28, for example, at the time of inspection of meshing portions between the sun gear 24 and planetary gears 26.

The ring-shaped internal gear 25 is formed as a tubular gear with a short-diameter so as to circumvent the sun gear 24, planetary gears 26, support pins 27 and carrier 28 radially from outside, and located in an inner peripheral side of the outer drum 22 with a narrow radial gap space therebetween. The internal teeth on the inner peripheral side of the ring-shaped internal gear 25 are continually meshed with the respective planetary gears 26. Further, the internal gear 25 is attached to a second-stage sun gear 32 through a coupling 30 which will be described hereinafter.

In this instance, as the sun gear 24 of the first-stage planetary gear reduction mechanism 23 is rotated integrally by the rotational shaft 18 of the wheel drive motor 17, the rotation of the sun gear 24 is converted into rotating and revolving movements of a plural number of planetary gears 26. Further, rotations of the planetary gears 26 (rotations on their own axes) are transmitted to the ring-shaped internal gear 25, putting the latter in rotation at a reduced speed. The rotation of the internal gear 25 is transmitted to the second-stage planetary gear reduction mechanism 31 through a coupling 30.

On the other hand, the revolving movement of each planetary gear 26 is transmitted to the outer drum 22 by way of rotation of the carrier 28. However, since the outer drum 22 is arranged to rotate integrally with the below-described second-stage internal gear 33, the revolution of each planetary gear 26 is suppressed into synchronization with the internal gear 33 (the wheel mounting case 19).

Indicated at 30 is a coupling as a rotation transmitting member which is arranged to rotate integrally with the first-stage internal gear 25. The coupling 30 is in the form of an annular plate which is located in a position between the first-stage planetary gear reduction mechanism 23 and the second-stage planetary gear reduction mechanism 31, and its outer peripheral side is coupled with the first-stage internal gear 25 by means of a spline. On the inner peripheral side, the coupling 30 is coupled with the below-described second-stage sun gear 32 by means of a spline.

Thus, by the coupling 30, rotation of the first-stage internal gear 25 is transmitted to the second-stage sun gear 32 to put the sun gear 32 in rotation integrally with and at the same speed as the ring-shaped internal gear 25. A plural number of oil holes (not shown) are formed in the coupling 30 to circulate the below-described lubricant oil G between inner and outer sides of the coupling 30.

Denoted at 31 is a second-stage planetary gear reduction mechanism, constituting a reduction gear mechanism, which is adopted in the first embodiment. This planetary gear reduction mechanism 31 is located between the rotational shaft 18 of the wheel drive motor 17 and the wheel mounting case 19 through the first-stage planetary gear reduction mechanism 23 to transmit the rotation of the rotational shaft 18 to the wheel mounting case 19 at a reduced speed in cooperation with the first-stage planetary gear reduction mechanism 23, thereby producing a large torque in the wheel mounting case 19.

In this case, the second-stage planetary gear reduction mechanism 31 is composed of a tubular sun gear 32 which is mounted coaxially with the rotational shaft 18 and rotates integrally with the coupling 30, planetary gears 34, for example, three planetary gears 34 (only one of which is shown in the drawing) which are meshed with the sun gear 32 and ring-shaped internal gear 33, and put in rotating movement in step with rotation of the sun gear 32, and a carrier 36 which rotatably supports the respective planetary gears 34 through a support pin 35.

The second-stage carrier 36 is integrally formed with a tubular fitting portion 36A on its inner peripheral side, in fitting engagement with the small diameter tubular portion 15B of the tubular spindle 15. This tubular fitting portion 36A is detachably fixed in an inner periphery of the fore end side of the small diameter tubular portion 15B for constituting the tubular spindle 15 in a non-rotatable state through a spline coupling means. The rotational shaft 18 is provided extending in the axial direction in the tubular fitting portion 36A of the carrier 36, along with a fore end side of a below-described supply pipe 45 with a gap therebetween.

On the other hand, the second-stage internal gear 33 is formed as a tubular body with a short diameter, and integrally fixed between the wheel mounting case 19 and the outer drum 22 in such a way as to circumvent the sun gear 32, planetary gears 34, support pins 35 and carrier 36 radially from outside. Further, internal teeth for meshing with the planetary gears 34 are formed on the inner peripheral side of the ring-shaped internal gear 33.

In this instance, since the carrier 36 of the second-stage planetary gear reduction mechanism 31, which constitutes the final stage, is fixed to the tubular spindle 15, revolving movements of the planetary gears 34 (rotation of the carrier 36) is restrained. Therefore, as the sun gear 32 of the second-stage planetary gear reduction mechanism 31 is put in rotation integrally with the coupling 30, the rotation of the sun gear 32 is converted into rotations of a plural number of planetary gears 34, and this rotation is outputted from the ring-shaped internal gear 33 as a reduced-speed rotation. As a consequence, by the two-stage speed reduction through the first- and second-stage planetary gear reduction mechanisms 23 and 31, reduced speed and a high output, i.e., rotation of a low speed and a large rotational torque is transmitted to the wheel mounting case 19 on the side of the rear wheel 7.

On the other hand, denoted at 37 is a partition wall which is provided internally of the tubular spindle 15 in the vicinity of the wheel drive motor 17. This partition wall 37 is in the form of an annular partition plate which is fixed to a mounting portion 15D of the tubular spindle 15 by bolts in its outer peripheral side. In this instance, by the partition wall 37, the inner space of the tubular spindle 15 is partitioned into a motor room 38 on one axial side (on the inner side) of the partition wall 37, and a tubular space 39 on the other axial side (on the outer side). The tubular space 39 is constantly held in communication with the inside of the wheel mounting case 19 through the tubular fitting portion 36A of the carrier 36 and inner peripheral side of the sun gear 32.

Indicated at 40 is a seal device which is provided in the vicinity of the bearing 20. This seal device 40 maintains a liquid tight seal between the tubular spindle 15 and the wheel mounting case 19, as shown in FIG. 4, and is constituted by what is called a floating seal. Further, the seal device 40 is adapted to prevent leaks of the lubricant oil G which is pooled between the tubular spindle 15 and the wheel mounting case 19, while preventing intrusion of sand, soil and rainwater.

Now, given below is a description on the construction of a lubricant oil circulation means 41 (hereinafter referred to simply as "lubricant oil circulation device 41") which is a principal portion in accordance with the first embodiment.

The lubricant oil circulation device 41 serves to forcibly circulate the lubricant oil G to and from inner and outer sides of the wheel mounting case 19, cooling down the lubricant oil G in circulation at an oil cooler 49, which will be described hereinafter. The lubricant oil circulation device 41 is composed of suction pipes 42 and 43, supply pipes 44 and 45, lubricant pump 46, pump drive motor 47, filter 48, oil cooler 49 and vehicle controller 54 (see FIG. 6) serving as a control means, as described in greater detail hereinafter.

Here, the lubricant oil circulation device 41 has left and right circulation lines 41A (only the left one is shown in FIG. 4) which are independent between left and right in correspondence with the left and right motor accommodating tubes 14 and tubular spindles 15 illustrated in FIG. 2. Each of these circulation lines 41A is constituted by the suction pipes 42 and 43, the supply pipes 44 and 45, and the like, which will be described hereinafter. These circulation lines 41A are each provided independently for the left and right wheel mounting cases 19 to circulate the lubricant oil G independently, which is pooled in each one of the left and right wheel mounting cases 19, along the left and right circulation lines 41A by lubricant pumps 46, which will be described hereinafter.

Figure 5:
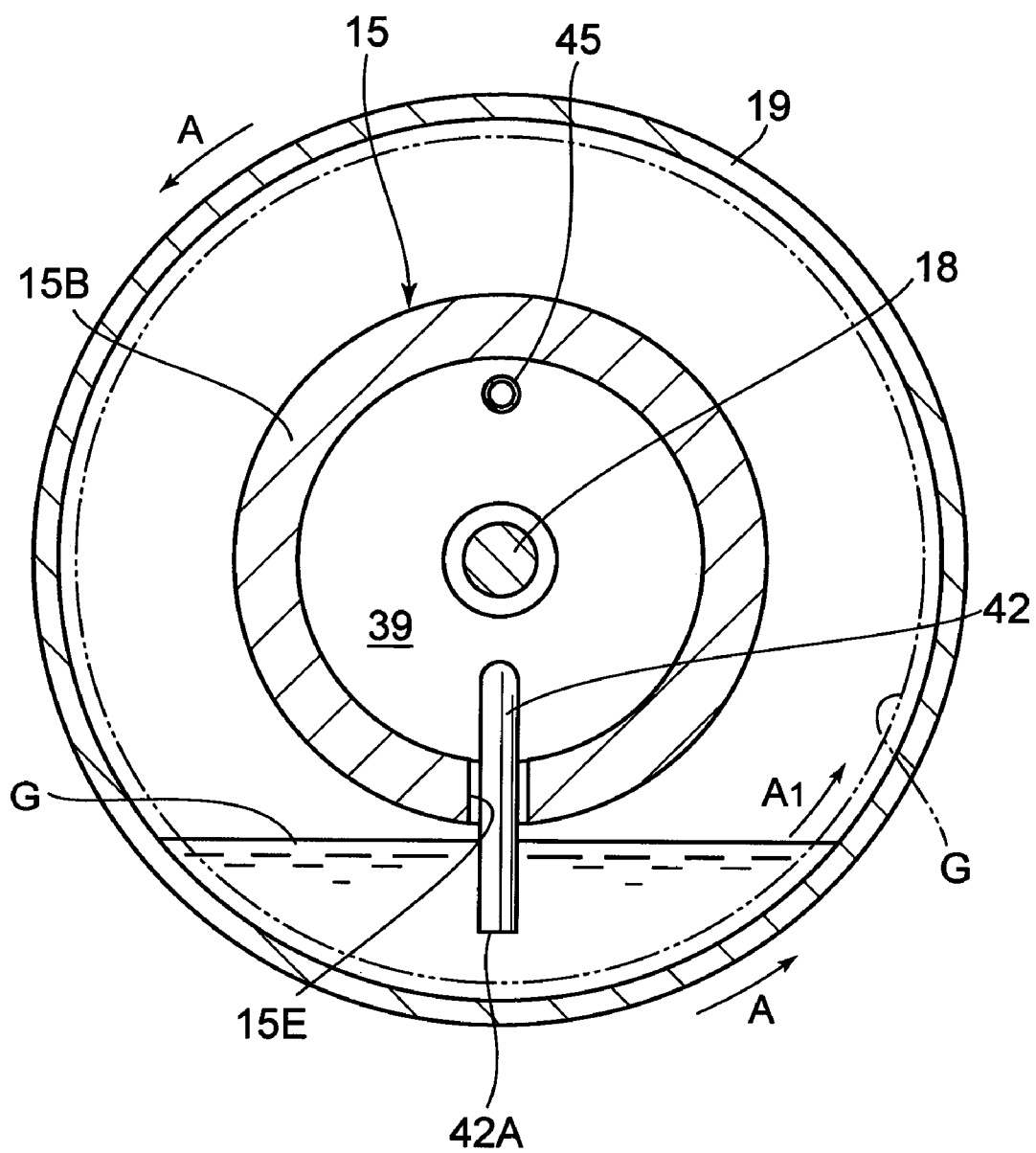

Indicated at 42 is a suction pipe which constitutes a suction side of each one of the circulation lines 41A. As shown in FIGS. 4 and 5, a fore end side of this suction pipe 42 is extended radially outward (downward) from the small diameter tubular portion 15B of the tubular spindle 15 through the radial hole 15E of the tubular spindle 15. Further, the bottom end (fore end) of the suction pipe 42 serves as a suction port 42A immersed in the lubricant oil G which is pooled in a lower position of the wheel mounting case 19. Upon driving a below-described lubricant pump 46, the lubricant oil G is sucked into the suction pipe 42 through the suction port 42A.

Indicated at 43 is another suction pipe which is located on the side of the motor room 38 of the tubular spindle 15. As shown in FIG. 4, this suction pipe 43 is connected to the base end side of the suction pipe 42 at a position of the partition wall 37, and extended through the motor accommodating tube 14 toward a lubricant pump 46, which will be described hereinafter. Both of these suction pipes 42 and 43 are connected to a suction side of the lubricant pump 46.

Denoted at 44 and 45 are supply pipes which constitute an output side of the circulation lines 41A. These supply pipes 44 and 45 are connected to the output side of the lubricant pump 46 to supply the lubricant oil G to planetary gear reduction mechanisms 23 and 31 in the wheel mounting case 19. In this instance, the supply pipe 44 is disposed on the motor room 38 side of the tubular spindle 15, and its base end side is connected to the output side of the lubricant pump 46. Meanwhile, the base end side of the supply pipe 45 is connected to the fore end side of the supply pipe 44 at the position of the partition wall 37. A fore end side of the supply pipe 45 is extended axially through a tubular space 39 of the tubular spindle 15 and is disposed at a position higher than the rotational shaft 18.

Designated at 46 are lubricant pumps which are each rotationally driven by a pump drive motor 47 serving as an electric motor. The lubricant pumps 46 are respectively provided in the left and right circulation lines 41A as shown in FIG. 4. As the lubricant pump 46 is rotated by being driven by the pump drive motor 47, the lubricant oil G which is sucked in through the suction pipes 42 and 43 is sent forward to the supply pipes 44 and 45 through a filter 48 and an oil cooler 49, which will be described hereinafter.

Denoted at 49 are oil coolers which are provided as heat exchangers in the course of the supply pipes 44, and the oil coolers 49 are disposed in the left and right circulation lines 41A, respectively. These oil coolers 49 serve to cool down the lubricant oil G which is in circulation through the circulation lines 41A, sending the lubricant oil G of approximately room temperature toward the supply pipes 45, for example.

Now, given below is a description on various sensors and vehicle controller (control means) which are adopted in this embodiment.

In the first place, indicated at 50 are pressure sensors which serve to detect output pressure of the lubricant pump 46. As shown in FIG. 4, the pressure sensors 50 are disposed in the course of the supply pipe 44 by being located between the output side of the lubricant pump 46 and the filter 48. Besides, the pressure sensor 50 detects the output pressure of the lubricant pump 46 and outputs its detection signal to the vehicle controller 54, as described hereinafter.

Denoted at 51 is an oil temperature sensor for detecting the temperature of the lubricant oil G. As shown in FIG. 4, this oil temperature sensor 51 is disposed such as in the course of the supply pipe 44 by being located between the output side of the lubricant pump 46 and the filter 48. The oil temperature sensor 51 detects the temperature of the lubricant oil G before it is cooled by the oil cooler 49 as an oil temperature T, as shown in FIG. 4, and outputs its detection signal to the below-described vehicle controller 54.

Here, the present inventors made a comparison between the temperature of the lubricant oil G pooled in the wheel mounting case 19 and the temperature T of the lubricant oil G detected by the oil temperature sensor 51 on the output side of the lubricant pump 46. It was then confirmed that, during the drive of the lubricant pump 46, there is not substantial difference between the two temperatures since the lubricant oil G continues to circulate from the suction pipes 42 and 43 toward the supply pipe 44.

However, when the lubricant pump 46 is stopped, since the lubricant oil G cannot flow from the suction pipes 42 and 43 toward the supply pipe 44, the temperature of the lubricant oil G cannot be detected by the oil temperature sensor 51 provided on the output side of the lubricant pump 46. For this reason, the configuration provided is such that the temperature T (detection signal) of the lubricant oil G detected by the oil temperature sensor 51 is outputted to the vehicle controller 54 (see FIG. 6) only during the drive of the lubricant pump 46, and the temperature (latest data during driving) detected by the oil temperature sensor 51 immediately before the stop of the lubricant pump 46 is used as a substitute for the temperature detection signal (temperature T of the lubricant oil G) at the time when the lubricant pump 46 is stopped.

Indicated at 52 is a speed sensor which is adapted to detect the output rotation of the wheel drive motor 17. As shown in FIG. 4, this speed sensor 52 is located in the vicinity of a rotating disk 18A on the rotational shaft 18 to detect rotational speed of the rotating disk 18A as a rotational speed of the rear wheel 7 (as a travel speed of the vehicle). Namely, since the rotation at a speed reduction ratio (for example, a speed reduction ratio of 30 to 40), which is predetermined by the multi-stage planetary gear reduction mechanisms 23 and 31 with respect to the rotational speed of the wheel drive motor 17 (rotational shaft 18), has been transmitted to the rear wheel 7 (wheel mounting case 19), the rotational speed of the rear wheel 7 (travel speed of the vehicle) can be determined by detecting the rotational speed of the rotating disk 18A.

Denoted at 53 is a motor temperature sensor serving as a drive source temperature sensor for detecting the temperature of the wheel drive motor 17. As shown by the dotted line in FIG. 4, the motor temperature sensor 53 is provided on such as an inner wall of a motor case of the wheel drive motor 17. The motor temperature sensor 53 detects the temperature of the wheel drive motor 17 (for example, stator-side temperature), i.e., the drive source, as a motor temperature Tm, and outputs its detection signal to the below-described vehicle controller 54.

Here, the present inventors conducted an inspection of comparing the actual temperature of the lubricant oil G pooled in the wheel mounting case 19 and the motor temperature Tm of the wheel drive motor 17 detected by the motor temperature sensor 53. It was then confirmed that, both when the lubricant pump 46 is being driven and when it is stopped, the temperature of the lubricant oil G also rises in conjunction with the rise of the motor temperature Tm of the wheel drive motor 17, and that the motor temperature Tm of the wheel drive motor 17 similarly drops when the temperature of the lubricant oil G drops.

Further, when the temperature of the lubricant oil G pooled in the wheel mounting case 19 cannot be detected by using the oil temperature sensor 51 provided on the output side of the lubricant pump 46, as described above, the temperature of the lubricant oil G is substituted by or estimated from the motor temperature Tm of the wheel drive motor 17 detected by the motor temperature sensor 53. Namely, the present inventors have found that there is a certain degree of correlation between the motor temperature Tm of the wheel drive motor 17 and the temperature of the lubricant oil G, and the temperature of the lubricant oil G is therefore substituted by or estimated from the motor temperature Tm on the basis of this correlation.

Figure 6:
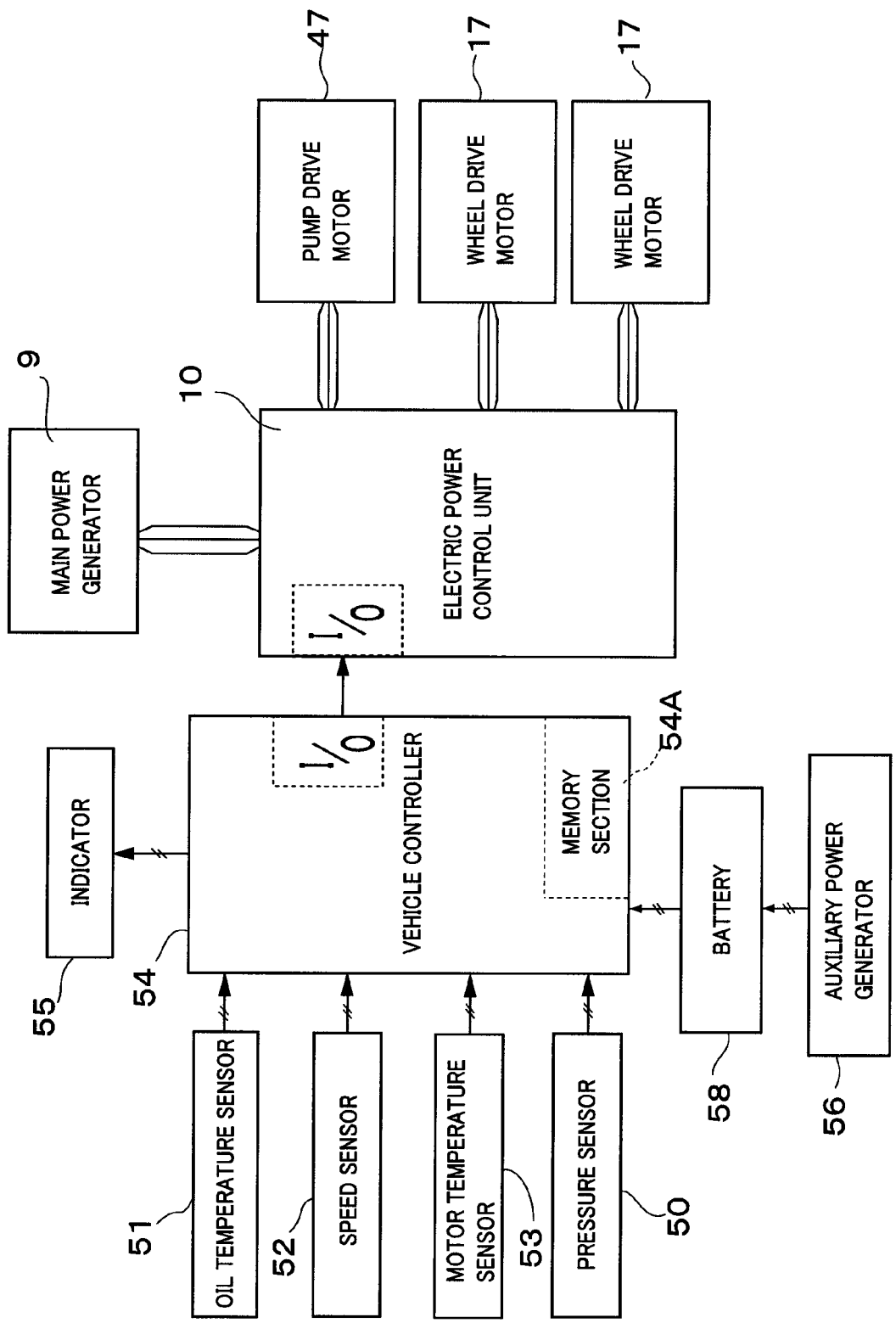

Indicated at 54 is a vehicle controller which serves as a control means and is constituted by a microcomputer and the like. As for this vehicle controller 54, as shown in FIG. 6, its input side is connected to the pressure sensor 50, the oil temperature sensor 51, the speed sensor 52, the motor temperature sensor 53, and the like while its output side is connected to an indicator 55 and the like and it is further connected to the left and right wheel drive motors 17, the pump drive motor 47, and the like through the electric power control unit 10.

The vehicle controller 54 has a memory section 54A consisting of a ROM, a RAM (including a nonvolatile memory), and the like. Further, stored in the memory section 54A of the vehicle controller 54 are, among others, a predetermined temperature Tms (for example, Tms=40° C. or thereabouts), a reference speed Vc (for example, Vc=18 to 28 km/h), and a reference temperature Tcs (for example, Tcs=55 to 70° C.), which are shown in FIG. 7, and a first initial temperature T1 (for example, T1=45 to 50° C.) and a second initial temperature T2 (for example, T2=50 to 55° C.), which are shown in FIG. 8.

Figure 7:
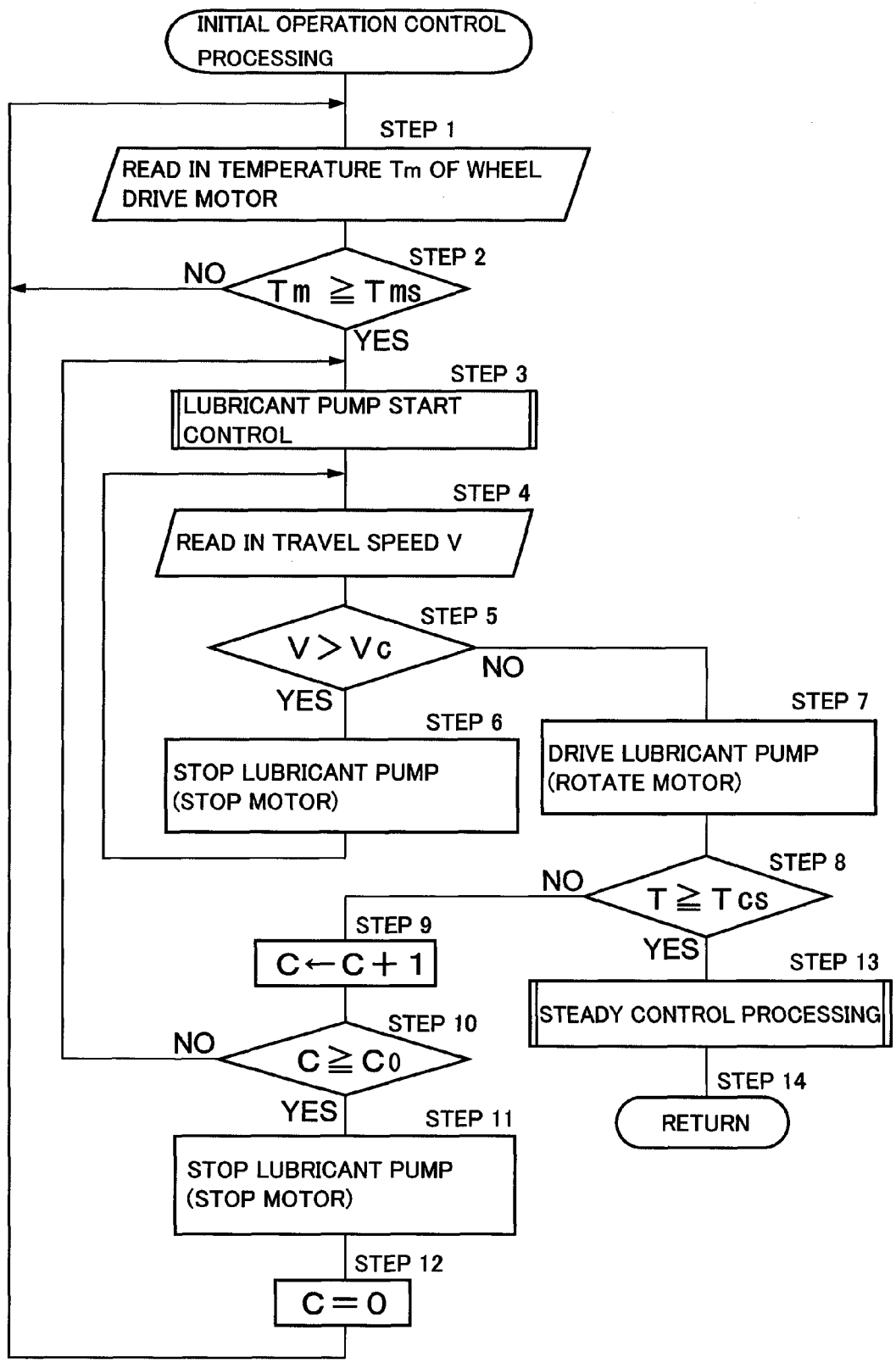
FIG. 7 is a flow chart of a initial operation control processing and the like by the vehicle controller.
Figure 8:
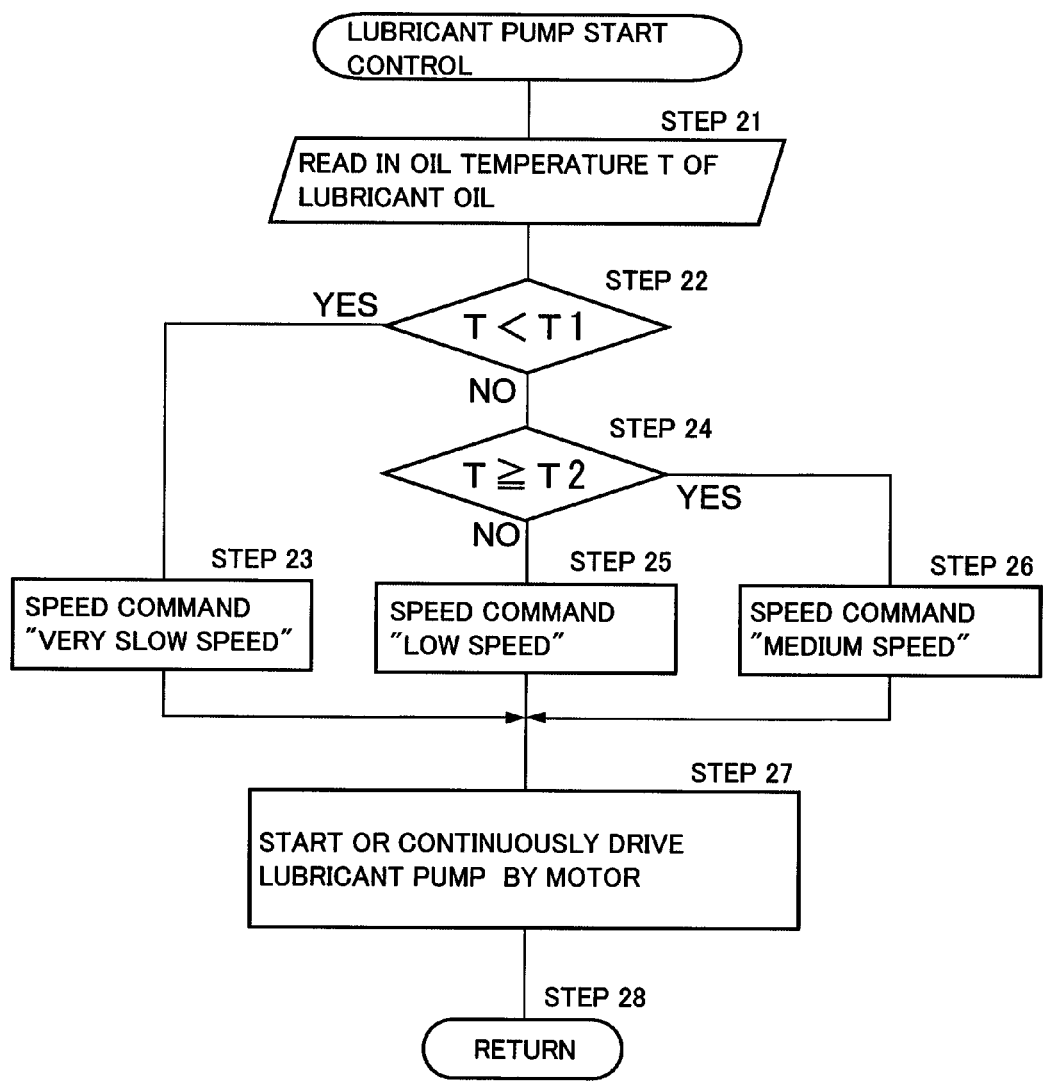
FIG. 8 is a flow chart of a lubricant pump start control in FIG. 7 in specific form.

Further stored in the memory section 54A of the vehicle controller 54 are, for instance, a program (not shown) for supply control processing of the lubricant oil to carry out such as the drive and stop of the pump drive motor 47, a program for initial operation control processing shown in FIG. 7, a program for lubricant pump start control shown in FIG. 8, and so forth.

Indicated at 56 is an auxiliary power generator which is mounted on the vehicle body 2 separately from the main power generator 9. As shown in FIG. 2, this auxiliary power generator 56 is driven by the engine 8 through a belt drive mechanism 57 to generate electric power, for example, a direct current of 24V. The electric power generated by the auxiliary power generator 56 is used for charging a battery 58, which constitutes a power supply source for the vehicle controller 54.

Denoted at 59 is a hoist cylinder which is operative for lifting up and down the vessel 3 of the dump truck 1 of FIG. 1. The hoist cylinders 59 are respectively disposed on both left and right sides of the vehicle body 2 in such a manner as to be positioned between the front wheels 6 and the rear wheels 7, as shown in FIG. 1. Further, pressure oil is fed to and from each hoist cylinder 59 from the outside to vertically expand and contract same, lifting (tilting) the vessel 3 up and down about the pin coupling portion 4 of the rear side.

Indicated at 60 is an operating oil tank which is attached to a side surface of the vehicle body 2 by being positioned below the vessel 3 as shown in FIG. 1. Operating oil in the operating oil tank 60 is pressurized by the above-mentioned hydraulic pump and fed as pressure oil to and from the hoist cylinders 59 and a steering cylinder of a power steering system, and the like.

The dump truck 1 of this embodiment has the above-described construction, and its operation will be described in the manner as follows.

In the first place, the engine 8 of FIG. 2 is started by an operator who has got into the cabin 5 of the dump truck 1. Whereupon, a main hydraulic pump (not shown), which is a main hydraulic pressure source, is rotationally driven by the engine 8, and at the same time the main and auxiliary power generators 9 and 56 are put in operation to generate electric power. The electric power generated by the auxiliary power generator 56 is charged in the battery 58, while the electric power generated by the main power generator 9 is supplied to the left and right wheel drive motors 17 and the pump drive motor 47 and the like through the electric power control unit 10.

When the vehicle is driven for traveling, a vehicle drive current is supplied to each one of the wheel drive motors 17 of the rear wheels 7 side from the electric power control unit 10. At this time, the vehicle controller 54 individually feedback controls the rotational speeds of the left and right wheel drive motors 17 by the electric power control unit 10. Thus, the left and right rear wheels 7 are rotationally driven separately and independently of each other as the drive wheels of the vehicle, and driven at the same speed when the vehicle is in travel in a straightforward direction.

Namely, by the travel drive apparatus 11 which is provided on the rear wheel 7 side of the dump track 1, the rotation of the wheel drive motor 17 (the rotational shaft 18) is reduced in speed through the multi-stage planetary gear reduction mechanisms 23 and 31, for example, at a reduction ratio of from 30 to 40, to drive the drive wheels (the rear wheel 7) of the vehicle to travel with a large rotational torque together with the wheel mounting case 19. In this way, the left and right rear wheels 7 are driven respectively by the left and right wheel drive motors 17 independently of each other at controlled rotational speeds.

Further, as shown in FIGS. 3 to 5, the lubricant oil G is pooled in the wheel mounting case 19, up to a surface level which is lower than the small diameter tubular portion 15B of the tubular spindle 15. That is to say, by lowering the surface level of the lubricant oil in the wheel mounting case 19, the stirring resistance (viscous resistance) of the lubricant oil G resulting from the rotation of the ring-shaped internal gear 25, planetary gears 26 and 34, coupling 30 and the like can be suppressed to as small a value as possible.

In this instance, as the first- and second-stage planetary gear reduction mechanisms 23 and 31 are put in operation by the rotational shaft 18 of the wheel drive motor 17, the lubricant oil G in the wheel mounting case 19 is incessantly raked upward by the first- and second-stage internal gears 25 and 33 to effect rake-up lubrication and the like with respect to the planetary gear reduction mechanisms 23 and 31.

Then, as soon as the lubricant pump 46 is driven by the pump drive motor 47 of FIG. 4, the lubricant oil G in the wheel mounting case 19 is sucked into the lubricant pump 46 through the suction port 42A of the suction pipe 42, and delivered toward the supply pipes 44 and 45. At this time, the lubricant oil G is supplied from the fore end side of the supply pipe 45 to the sun gears 24 and 32, the planetary gears 26 and 34, and the like of the planetary gear reduction mechanisms 23 and 31 in a state in which the lubricant oil G is cooled down by the oil cooler 49 to keep the respective gears in a lubricated state.

Further, the lubricant oil G which has been supplied to the first- and second-stage planetary gear reduction mechanisms 23 and 31 in the wheel mounting case 19 is caused to gradually drip down by gravity while lubricating tooth faces of the respective gears, and is pooled again at the lower position of the wheel mounting case 19. Then, the lubricant oil G pooled at the lower position of the wheel mounting case 19 is sucked again into the lubricant pump 46 through the suction port 42A of the suction pipe 42 and delivered to the supply pipes 44 and 45 side.

Incidentally, when the dump truck 1 (vehicle) is traveling, the wheel mounting case 19 rotates together with the rear wheel 7 at a fast speed in the direction of arrow A in FIG. 5. For this reason, the lubricant oil G pooled in the wheel mounting case 19 is raked up in the direction of arrow A1 along the inner peripheral surface of the wheel mounting case 19 and is stuck thereto. Then, when the travel speed of the dump truck 1 is increased, the lubricant oil G is subjected to the influence of centrifugal force accompanying the high speed rotation inside the wheel mounting case 19 which rotates at high speed together with the rear wheel 7.

As a consequence, as indicated by a two-dot chain line in FIG. 5, the lubricant oil G in the wheel mounting case 19 behaves in such a way as to stick on the entire inner wall surfaces of the wheel mounting case 19, causing the surface level of the lubricant oil G to drop below the suction port 42A of the suction pipe 42. Thus, when the travel speed is increased, the suction port 42A of the suction pipe 42 disposed in the wheel mounting case 19 becomes located away from the surface level of the lubricant oil G, disabling the suction action of the lubricant oil G by the lubricant pump 46. Besides, in such a case, the lubricant pump 46 is put in a dry idling operation which would cause the seals, bearings, and the like of the lubricant pump 46 are likely to become worn and damaged at an early period, causing the pump life to become shortened.

Accordingly, in order to prevent the lubricant pump 46 from assuming the idling state, the present inventors studied the feasibility of immediately stopping the drive of the lubricant pump 46 when the travel speed V of the vehicle has become faster than a predetermined determination speed V1 (for example, V1=45 to 47 km/h). However, like at the time of starting the operation, when the engine 8 is initially started to start operating the vehicle (stage of initial operation control), the temperature of the lubricant oil G pooled in the wheel mounting case 19 is low, so that the viscous resistance becomes large, and the suction characteristic of the lubricant oil G by the lubricant pump 46 undesirably changes due to its dependence on the temperature of the lubricant oil G (viscous resistance).

Namely, when the temperature of the lubricant oil is low at a temperature of, for example, not more than 40 to 50° C. in the stage of initial operation control of the vehicle, even if the vehicle is traveling at a lower speed than the aforementioned determination speed V1 during steady operation, the suction characteristic based on the lubricant pump 46 becomes instable. When cavitation is prone to occur due to the suction of air owing to such instability of the suction characteristic, the pump life can possibly be shortened.

In the case of the travel drive apparatus 11 used in the dump truck 1, the configuration provided is such that the planetary gear reduction mechanisms 23 and 31 are provided in the wheel mounting case 19, and the lubricant oil G is pooled in its interior. For this reason, there is a problem in that it is, in practice, difficult to provide an oil temperature sensor inside the wheel mounting case 19 to directly detect the temperature of the lubricant oil, since structural restrictions are large.

Therefore, the present inventors studied the feasibility of providing the oil temperature sensor 51 on the output side of the lubricant pump 46, as illustrated in FIG. 4, by being located outside the wheel mounting case 19. In this case, however, when the drive of the lubricant pump 46 is stopped, it becomes impossible to send the lubricant oil G pooled in the wheel mounting case 19 to the position of the oil temperature sensor 51, so that it is impossible to directly detect the temperature of the lubricant oil G by using the oil temperature sensor 51.

When starting a day's work, for example, at the time of starting the operation of the dump truck 1, unless the lubricant pump 46 is started by the pump drive motor 47, the temperature of the lubricant oil G cannot be detected by using the oil temperature sensor 51. In other words, if the travel of the dump truck 1 is continued without starting the lubricant pump 46, i.e., without detecting the temperature of the lubricant oil G, even if the temperature of the lubricant oil G in practice rises gradually, it would be impossible to monitor its temperature state.

Accordingly, in this embodiment, the motor temperature sensor 53 is provided on the wheel drive motor 17 as the drive source, and not the temperature of the lubricant oil G but the temperature of the wheel drive motor 17 is detected by the motor temperature sensor 53 at the start of the vehicle operation. Then, by using the temperature of the wheel drive motor 17 detected by the motor temperature sensor 53, "initial operation control processing" and "lubricant pump start control" for controlling the start of the lubricant pump 46 are respectively executed in accordance with the processing programs shown in FIGS. 7 and 8 in this configuration.

First, when the processing operation is started by accompanying the operation start of the vehicle, in Step 1 in FIG. 7, the motor temperature Tm of the wheel drive motor 17 is read from the motor temperature sensor 53. In a next Step 2, a determination is made as to whether or not the motor temperature Tm detected by the motor temperature sensor 53 has risen until it has reached the predetermined temperature Tms (for example, Tms=40° C.).

Here, the predetermined temperature Tms is a temperature for determining that a temperature at which the lubricant oil G in the wheel mounting case 19 requires cooling is approaching. Essentially, this predetermined temperature Tms is a temperature for comparatively determining whether or not the temperature T of the lubricant oil G has reached the predetermined temperature Tms. However, at the operation start of the vehicle, the temperature T of the lubricant oil cannot be detected by the oil temperature sensor 51 unless the lubricant pump 46 is started once, as described above.

For this reason, the present inventors conducted an experiment of making a comparison between the actual temperature of the lubricant oil G pooled in the wheel mounting case 19 and the motor temperature Tm of the wheel drive motor 17 detected by the motor temperature sensor 53. Then, when the temperature T of the lubricant oil G pooled in the wheel mounting case 19 cannot be detected by using the oil temperature sensor 51 provided on the output side of the lubricant pump 46, the temperature of the lubricant oil G is substituted by or estimated from the motor temperature Tm detected by the motor temperature sensor 53. Namely, the present inventors have found that there is a certain degree of correlation between the motor temperature Tm of the wheel drive motor 17 and the temperature of the lubricant oil G, and the temperature of the lubricant oil G is therefore substituted by or estimated from the motor temperature Tm on the basis of this correlation.

Then, while "NO" is given in the determination in Step 2, the motor temperature Tm detected by the motor temperature sensor 53 is lower than the predetermined temperature Tms. In this state, it can be determined that the temperature of the lubricant oil G pooled in the wheel mounting case 19 is also lower than the predetermined temperature Tms, and that the lubricant oil G in the wheel mounting case 19 does not require cooling, so that the operation returns to Step 1 to continue the processing.

On the other hand, if "YES" is given in the determination in Step 2, the motor temperature Tm of the wheel drive motor 17 has become equal to or higher than the predetermined temperature Tms. In this case, the operation proceeds to a next Step 3 to execute "lubricant pump start control" in accordance with Steps 21 to 28 shown in FIG. 8, and the lubricant pump 46 is started at one of "very slow speed", "low speed", and "medium speed".

Next, in Step 4 in FIG. 7, the travel speed V of the vehicle is read from the speed sensor 52. Then, in Step 5, a determination is made as to whether or not the travel speed V has exceeded the predetermined reference speed Vc (for example, Vc=18 to 28 km/h). Here, the reference speed Vc is set to a speed lower than the aforementioned determination speed V1 during steady traveling, and is set in accordance with the following Formula 1:

$$Vc \approx V1 \times (0.4 \text{ to } 0.6) \quad \text{(Formula 1)}$$

Namely, at the stage of initial operation control of the vehicle, the temperature T of the lubricant oil G is, for instance, not more than 40 to 50° C., and the viscous resistance is large. For this reason, even if the vehicle is traveling at a low speed close to approximately ½ or thereabouts of the aforementioned determination speed V1 during the steady traveling, there is a possibility that the suction characteristic based on the lubricant pump 46 becomes instable. Accordingly, during the initial operation control of the vehicle, the reference speed Vc based on Formula 1 becomes necessary. It should be noted that this reference speed Vc is a speed which has been determined from experimental data heretofore conducted.

Then, when "YES" is given in the determination in Step 5, it is the case where the travel speed V has become fast and has exceeded the reference speed Vc. In such a case, the rear wheel 7 rotates at high speed together with the wheel mounting case 19, and the lubricant oil G in the wheel mounting case 19 is subjected to the influence of centrifugal force accompanying the high speed rotation. For this reason, during the initial operation of the vehicle, the lubricant oil G in the wheel mounting case 19 behaves in such a manner as to stick to the entire periphery of the inner wall surface of the wheel mounting case 19, as shown by the two-dot chain line in FIG. 5, and the surface level of the lubricant oil G is likely to drop to a position lower than the suction port 42A of the suction pipe 42.

In consequence, the suction port 42A of the suction pipe 42 disposed in the wheel mounting case 19 becomes located away from the surface level of the lubricant oil G, so that the suction characteristic based on the lubricant pump 46 becomes instable, and cavitation is prone to occur due to the suction of air, causing the pump life to become shortened.

Accordingly, in such a case, the operation proceeds to Step 6 to stop the pump drive motor 47 and interrupt the drive of the lubricant pump 46. It is hence possible to prevent the lubricant pump 46 from idling or being rotated in a state close thereto, thereby making it possible to overcome the drawbacks such as the occurrence of the cavitation. Subsequently, the operation returns to Step 4 to continue the processing that follows.

On the other hand, when "NO" is given in the determination in Step 5, it is the case where the travel speed V is equal to or lower than the reference speed Vc, and the operation proceeds to a next Step 7 to continue the rotation of the pump drive motor 47 so as to continue the drive of the lubricant pump 46. In consequence, the lubricant oil G in the wheel mounting case 19 is sucked into the lubricant pump 46 from the suction port 42A of the suction pipe 42 and is outputted toward the side of the supply pipes 44 and 45. At this time, the lubricant oil G in a state of having being cooled by the oil cooler 49 is supplied from the fore end side of the supply pipe 45 to the sun gears 24 and 32, the planetary gears 26 and 34, and the like of the planetary gear reduction mechanisms 23 and 31, thereby making it possible to hold the respective gears in the lubricated state.

In a next Step 8, a determination is made as to whether or not the oil temperature T has risen to the reference temperature Tcs or higher by making a comparison between the temperature T of the lubricant oil G detected by the oil temperature sensor 51 and the predetermined reference temperature Tcs after the lubricant pump 46 has started to be driven. In this case, the reference temperature Tcs is a temperature for determining whether or not the operational state of the dump truck 1 has shifted from the state of initial operation to the state of steady operation, and is set to, for example, Tcs=55 to 70° C. or thereabouts.

Then, while "NO" is being given in the determination in Step 8, it can be determined that the temperature T of the lubricant oil G is lower than the reference temperature Tcs, and that the operational state of the vehicle is the state in which initial operation control is to be continued. In this case, the operation proceeds to a next Step 9 to increment a counter C as "C←C+1".

Then, in a next Step 10, a determination is made as to whether or not the count value of the counter C has reached a predetermined value C0 (for example, a delay time of 0.5 to 2 minutes or thereabouts) corresponding to a predetermined delay time. Here, while "NO" is being given in the determination in Step 10, it can be determined that it is a stage before the count value of the counter C reaches the predetermined value C0, and although the lubricant pump 46 is being driven due to the processing in and after the aforementioned Step 3, the forced circulation of the lubricant oil G is not yet being effected sufficiently.

Accordingly, in this case, after the determination of "NO" in Step 10, the operation returns to Step 3 to continue the processing that follows. Then, when "YES" is given in the determination in Step 10 while the processing in and after Step 3 is being repeated, it can be determined that the forced circulation of the lubricant oil G by the drive of the lubricant pump 46 has been carried out sufficiently, and that the lubricant oil G pooled in the wheel mounting case 19 has been replaced by the lubricant oil which has been cooled by the oil cooler 49.

Therefore, when "YES" is given in the determination in Step 10, the supply of electric power to the pump drive motor 47 is stopped in a next Step 11 to stop the lubricant pump 46 so as to interrupt the forced circulation described above. Then, in a next Step 12, the count value of the counter C is reset to "0". Subsequently, the operation returns to Step 1 to continue the processing that follows.

On the other hand, when "YES" is given in the determination in the aforementioned Step 8, it can be determined that the temperature T of the lubricant oil G has become equal to or higher than the reference temperature Tcs and has become warm, and that the operational state of the vehicle has proceeded from the initial operation to the steady operation control. In this case, the operation proceeds to a next Step 13 to effect steady control processing, and thereafter the operation returns to the main processing (not shown) in Step 14.

In this case, in the steady control processing in Step 13, processing is carried out which is substantially similar to that of the travel control apparatus disclosed in International Publication No. WO 2009/016884 filed earlier by the present applicant. Namely, the drive and stop of the lubricant pump 46 are controlled in accordance whether or not the travel speed V is not more than the determination speed V1 (for example, V1=45 to 47 km/h) during steady traveling. In consequence, when the travel speed V of the dump truck 1 exceeds the determination speed V1, the drive of the lubricant pump 46 is stopped, so that it is possible to attain the prevention of idling of the lubricant pump 46.

Next, referring to FIG. 8, a detailed description will be given of the lubricant pump start control through Step 3 in FIG. 7. Namely, in Step 21 in FIG. 8, the temperature T of the lubricant oil is read from the oil temperature sensor 51.

In this case, at the starting stage of the vehicle operation, unless the lubricant pump 46 is rotated (started) once, the temperature T of the lubricant oil cannot be detected by the oil temperature sensor 51 provided on the output side of the lubricant pump 46, as described above. Accordingly, in this case, the temperature Tm of the wheel drive motor 17 detected earlier by the motor temperature sensor 53 is used as a substitute for the temperature T of the lubricant oil G.

It should be noted that it suffices in a case where the dump truck 1 is shipped from a manufacturing factory, a temperature equivalent to the predetermined temperature Tms (for example, Tms=40° C. or thereabouts) mentioned in Step 2 in FIG. 7 may be stored in advance in the memory or the like of the memory section 54A as an initial value in substitution for the temperature T of the lubricant oil. Then, when the temperature T of the lubricant oil G in the wheel mounting case 19 cannot be detected by the oil temperature sensor 51, the aforementioned initial value can be used as a detection value substituting the temperature T of the lubricant oil.

Then, in the second and subsequent processing in which the program cycle in Step 21 through Step 28 in FIG. 8 is repeated, the temperature T of the lubricant oil can be detected by the oil temperature sensor 51 as an actual temperature in conjunction with the rotational drive of the lubricant pump 46. Accordingly, at this time, processing in and after Step 22 can be carried out, for example, in accordance with the latest data (oil temperature T) which is consecutively updated.

Here, in step 22, a determination is made as to whether or not the oil temperature T is a temperature lower than the predetermined first initial temperature T1 (for example, T1=45 to 50° C. or thereabouts). Then, if "YES" is given in the determination in Step 22, it can be determined that although the oil temperature T is lower than the first initial temperature T1 and the temperature at which the lubricant oil G in the wheel mounting case 19 requires cooling is approaching, immediate cooling is not necessarily required.

For this reason, in a next Step 23, the speed command is set to "very slow speed", and, in below-described Step 27, the speed command is outputted to the pump drive motor 47 for setting its rotational speed to "very low speed" so that the lubricant pump 46 can be started quite slowly at "very low speed".

On the other hand, when "NO" is given in the determination in the aforementioned Step 22, the operation proceeds to a next Step 24 to determine whether or not the temperature T of the lubricant oil has risen to the second initial temperature T2 (T2=50 to 55° C. or thereabouts) or higher. Then, when "NO" is given in the determination in Step 24, the temperature T of the lubricant oil has become a temperature which is equal to or higher than the first initial temperature T1 and lower than the second initial temperature T2 (T1≦T<T2).

Then, in this case, it can be determined that although the temperature at which the lubricant oil G in the wheel mounting case 19 requires cooling is approaching, immediate cooling is not yet required. For this reason, in a next Step 25, the speed command is set to "low speed", and, in the below-described Step 27, the speed command is outputted to the pump drive motor 47 for setting its rotational speed to "low speed" so that the lubricant pump 46 can be started at "low speed".

Meanwhile, when "YES" is given in the determination in Step 24, the temperature T of the lubricant oil has become a temperature which is equal to or higher than the second initial temperature T2 (T≧T2). Therefore, in this case, it can be determined that the temperature at which the lubricant oil G in the wheel mounting case 19 requires cooling has approached, and that there is a need to effect cooling as early as possible.

For this reason, in a next Step 26, the speed command is set to "medium speed", and, in the below-described Step 27, the speed command is outputted to the pump drive motor 47 for setting its rotational speed to "medium speed" so that the lubricant pump 46 can be started moderately fast at "medium speed".

Further, in Step 27, a control signal (for example, a signal in which the frequency or the current value is variably controlled) based on the speed command is outputted to the pump drive motor 47 in accordance with any one of the aforementioned speed commands "very low speed", "low speed", and "medium speed", and the rotational speed of the pump drive motor 47 is variably controlled in accordance with this control signal.

In consequence, the lubricant pump 46 can be started at "very low speed", "low speed", or "medium speed". In a next Step 28, the operation returns in the state in which the lubricant pump 46 is thus started. That is, the operation subsequently returns to processing in and after Step 4 in FIG. 7. In addition, the latest data of the oil temperature T which has been read in Step 21 in FIG. 8 in the foregoing program cycle is adopted as the data of the oil temperature T used in Step 8 in FIG. 7.

Thus, in this embodiment, the configuration provided is such that even in the case where the temperature T of the lubricant oil G cannot be detected by the oil temperature sensor 51 provided on the output side of the lubricant pump 46 (for example, in the initial stage of the vehicle operation), the temperature Tm of the wheel drive motor 17 is detected by using the motor temperature sensor 53 provided on the wheel drive motor 17 as the drive source, to thereby control the start of the lubricant pump 46 in accordance with not the temperature T of the lubricant oil G, but the motor temperature Tm.

Namely, the present inventors have made the present invention upon finding that the temperature of the wheel drive motor 17 is also relatively low in the initial stage of the vehicle operation such as the start of the engine 8, and that there is a certain degree of correlation between the temperature T of the lubricant oil G pooled in the wheel mounting case 19 and the temperature (motor temperature Tm) of the wheel drive motor 17, when starting a operation.

Accordingly, by estimating the temperature T of the lubricant oil G from the temperature Tm of the wheel drive motor 17, monitoring is carried out as to whether or not the motor temperature Tm has risen to the predetermined temperature Tms at which the cooling of the lubricant oil G by forced circulation is required, and the drive of the lubricant pump 46 by the pump drive motor 47 can be stopped until the motor temperature Tm reaches the level of the predetermined temperature (Tms). In consequence, it is possible to prevent the lubricant pump 46 from being driven wastefully, making it possible to attain energy saving.

In addition, in this embodiment, the configuration provided is such that lubricant pump start control is carried out for starting the lubricant pump 46 by the pump drive motor 47 when the aforementioned temperature Tm of the wheel drive motor 17 has reached the predetermined temperature Tms, as shown in FIG. 8. Accordingly, if the lubricant pump 46 is started once, the lubricant oil G in the wheel mounting case 19 can be subjected to forced circulation, so that also at the time of starting the vehicle operation, the temperature T of the lubricant oil G can be detected by the oil temperature sensor 51 provided, for instance, on the output side of the lubricant pump 46.

Further, in the state subsequent to the start of the lubricant pump 46 by the control processing shown in FIG. 8, it is possible to determine whether or not the travel speed V of the vehicle detected by the speed sensor 52 has exceeded the reference speed Vc (a speed which is sufficiently lower than the aforementioned determination speed V1). When the travel speed V has exceeded the reference speed Vc, the lubricant pump can be stopped by the processing of Step 6 in FIG. 7.

As a result, even in cases where the temperature of the lubricant oil G has exceeded the predetermined temperature Tms in the initial stage of vehicle operation including the time of a warm-up operation, when the travel speed V of the vehicle has exceeded the reference speed Vc, the lubricant pump 46 can be stopped immediately to interrupt the suction of the lubricant oil G by the lubricant pump 46. In consequence, it is possible to prevent the cavitation from becoming prone to occur due to the entrainment of air during the suction of the lubricant oil G, thereby making it possible to improve the reliability, service life, and the like of the apparatus.

Meanwhile, until the travel speed V of the vehicle exceeds the reference speed Vc, the drive of the lubricant pump 46 is continued by the processing in Step 7 in FIG. 7. In this state, a determination is made as to whether or not the temperature T of the lubricant oil G detected by the oil temperature sensor 51 has risen to the reference temperature Tcs. When the oil temperature T is lower than the reference temperature Tcs, the lubricant pump 46 is stopped after the lapse of a delay time on the basis of this determination. In consequence, it is possible to prevent the lubricant pump 46 from being driven wastefully, making it possible to attain energy saving.

Further, in the processing in Steps 9 to 11 in FIG. 7, the lubricant pump 46 is driven over a delay time (for example, 0.5 to 2 minutes or thereabouts) corresponding to the predetermined value C0, so as to continue the forced circulation of the lubricant oil G. In this case, each time the operation of the vehicle is started by starting the engine 8, the start control of the lubricant pump 46 is carried out, whereby the lubricant oil G pooled in the wheel mounting case 19 can be replaced by the lubricant oil cooled by the oil cooler 49, so that the oil temperature T detected by the oil temperature sensor 51 can be fetched as a temperature nearly corresponding to the actual oil temperature.

It should be noted that in this embodiment, in the control processing shown in FIG. 7, the lubricant pump start control in Step 3 shows a specific example of a pump start means, which is a constituent requirement of the present invention. This pump start means includes the processing in Steps 21 to 27 shown in FIG. 8. Meanwhile, the determination processing in Step 5 in FIG. 7 shows a specific example of a speed determination means, which is another constituent requirement of the present invention, and the processing in Step 6 shows a specific example of a pump stop means, which is still another constituent requirement of the present invention.

In addition, the processing in Step 7 in FIG. 7 shows a specific example of a pump drive means, which is a further constituent requirement of the present invention, and the determination processing in Step 8 shows a specific example of a temperature determination means, which is a still further constituent requirement of the present invention. Further, the processing in Step 11 in FIG. 7 shows a specific example of another pump stop means, which is a further constituent requirement of the present invention.

In the above-described embodiment, by way of example the reduction gear mechanism is constituted by two-stage planetary gear reduction mechanisms consisting of the first-stage planetary gear reduction mechanism 23 and the second-stage planetary gear reduction mechanism 31. However, needless to say, the present invention is not limited to this particular example. For instance, there may be employed a reduction gear mechanism of a single stage or of more than three stages.

Further, in the above-described embodiment, by way of example the speed sensor 52 for detecting the rotational speed of the rear wheel 7 is provided on the wheel drive motor 17 and the rotational speed of the rotational shaft 18 is detected as the rotational speed of the rear wheel 7. However, the present invention is not limited to this particular example. For instance, arrangements may be adopted such that, the rotation of the rear wheel 7 is directly detected, or the rotation of the wheel mounting case 19 is detected. Namely, the speed sensor to be employed in the present invention suffices as long as it can detect the rotational speed of a wheel (rear wheel 7) either directly or indirectly.

Further, in the above-described embodiment, by way of example, the wheel drive motor 17 constituted by an electric motor is employed as the drive source. However, the present invention is not limited to this particular example. For instance, a hydraulic motor or the like may be employed as the drive source of the travel drive apparatus, if desired.

Further, in the above-described embodiment, by way of example, the dump truck 1 of the rear wheel drive system as a working vehicle. However, the present invention is not limited to this particular example, and may be applied to a dump truck of the front wheel drive system or the four-wheel drive system in which both front and rear wheels are driven, or may be applied to a working vehicle other than the dump truck having traveling wheels.

What is claimed is:

1. A travel drive apparatus for a working vehicle, comprising:
- a tubular wheel mounting case provided on a working vehicle and rotating integrally with a wheel;
- a reduction gear mechanism provided in said wheel mounting case to reduce the speed of rotation of a drive source and transmit it to said wheel mounting case;
- lubricant oil circulation means for supplying a lubricant oil to said reduction gear mechanism;
- an oil temperature sensor for detecting a temperature (T) of said lubricant oil; and
- a speed sensor for detecting a rotational speed (V) of said wheel, characterized in that;
- said drive source is provided with a drive source temperature sensor for detecting a temperature (Tm) of said drive source,
- said lubricant oil circulation means being constituted by an electric motor, a lubricant pump for forcibly circulating the lubricant oil pooled in said wheel mounting case by being driven by said electric motor, and control means for controlling the drive and stop of said electric motor in accordance with the rotational speed (V) of said wheel,
- said control means being configured to keep said electric motor in a stopped state until the temperature (Tm) of said drive source detected by said drive source temperature sensor reaches a predetermined temperature (Tms).

2. The travel drive apparatus for a working vehicle according to claim 1, wherein said control means comprises: pump start means for providing control to start said lubricant pump by said electric motor when the temperature (Tm) of said drive source has reached the predetermined temperature (Tms); speed determination means for determining whether or not the speed (V) of said wheel has exceeded a predetermined reference speed (Vc) in a state in which said lubricant pump has been started by said pump start means; and pump stop means for stopping said lubricant pump when it is determined that the speed (V) of said wheel has exceeded the reference speed (Vc) by said speed determination means.

3. The travel drive apparatus for a working vehicle according to claim 2, wherein said control means further comprises: pump drive means for driving said lubricant pump until it is determined that the speed (V) of said wheel has exceeded the reference speed (Vc) by said speed determination means; temperature determination means for determining whether or not the temperature (T) of said lubricant oil detected by said oil temperature sensor has risen to a predetermined reference temperature (Tcs) in a state in which said lubricant pump is being driven by said pump drive means; and another pump stop means for stopping said lubricant pump when it is determined that the temperature (T) of said lubricant oil is lower than the reference temperature (Tcs) by said temperature determination means.

4. The travel drive apparatus for a working vehicle according to claim 1, wherein a tubular axle housing extending in left and right directions is provided on a lower portion of a vehicle body for constituting said working vehicle, a pair of said wheel mounting cases are respectively provided rotatably on outer peripheral sides of both end sides in the left and right directions of said axle housing, and said lubricant oil is pooled at a lower position in each of said wheel mounting cases.

5. The travel drive apparatus for a working vehicle according to claim 4, wherein said lubricant oil circulation means includes a suction pipe for sucking the lubricant oil in said wheel mounting case by said lubricant pump and a supply pipe for supplying and circulating the lubricant oil sucked by said lubricant pump into an interior of said wheel mounting case; and said suction pipe extends from an interior of said axle housing into the interior of said wheel mounting case, its suction port being opened in the lubricant oil pooled at a lower position of said wheel mounting case.

6. The travel drive apparatus for a working vehicle according to claim 1, wherein said lubricant oil circulation means includes a suction pipe for sucking the lubricant oil in said wheel mounting case by said lubricant pump and a supply pipe for supplying and circulating the lubricant oil sucked by said lubricant pump into an interior of said wheel mounting case; and said suction pipe extends from an interior of an axle housing into the interior of said wheel mounting case, its suction port being opened in the lubricant oil pooled at a lower position of said wheel mounting case.

* * * * *